July 17, 1923.  
W. L. HAANEL  
ELECTRIC FOUNTAIN  
Filed April 15, 1920

1,462,281

Inventor:  
Walter L. Haanel  
By Force Bain & Hinkle  
Attys.

Patented July 17, 1923.

1,462,281

UNITED STATES PATENT OFFICE.

WALTER L. HAANEL, OF CHICAGO, ILLINOIS.

ELECTRIC FOUNTAIN.

Application filed April 15, 1920. Serial No. 374,194.

*To all whom it may concern:*

Be it known that I, WALTER L. HAANEL, a citizen of the United States, residing at Chicago, in the county of Cook and State of Illinois, have invented certain new and useful Improvements in Electric Fountains, of which the following is a specification.

This invention relates to electric fountains.

Electric fountains, as heretofore constructed, have ordinarily comprised a water basin with permanently attached piping or double walls provided with openings through which streams of water are projected, a power pump plant for circulating the water, and an electric lamp for illuminating the streams or jets of water. The water jets or streams are projected inwardly and upwardly through small openings or nozzles fixed to the basin walls or the piping. The power pump plant, lamp support and basin are so united as to form a complete unit.

Such structures are objectionable for many reasons among which are the following:

The power pump plant, lamp support and water basin form in effect a practically inseparable whole. It is consequently necessary to keep in stock complete fountains of different sizes and designs.

The water passages, being formed of the walls of the water basin, or pipes permanently attached thereto, are exceedingly difficult to clean or maintain in the best operative condition.

It is difficult to repair or clean and lubricate the power plant.

One of the objects of this invention is to overcome the above objections.

Another object is to provide an improved electric fountain.

Another object is to provide a power pump plant unit which may be applied to a variety of basins.

Another object is to provide a water projecting system which may be readily removed for cleaning and repairs.

Another object is to provide a power pump plant which may be easily lubricated.

Other objects and advantages will appear from the specification and claims.

An embodiment of the invention is illustrated in the accompanying drawings, wherein:—

Figure 1:
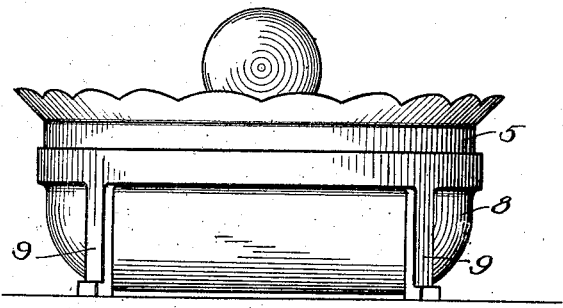
Fig. 1 is an elevation of a typical fountain.
Figure 2:
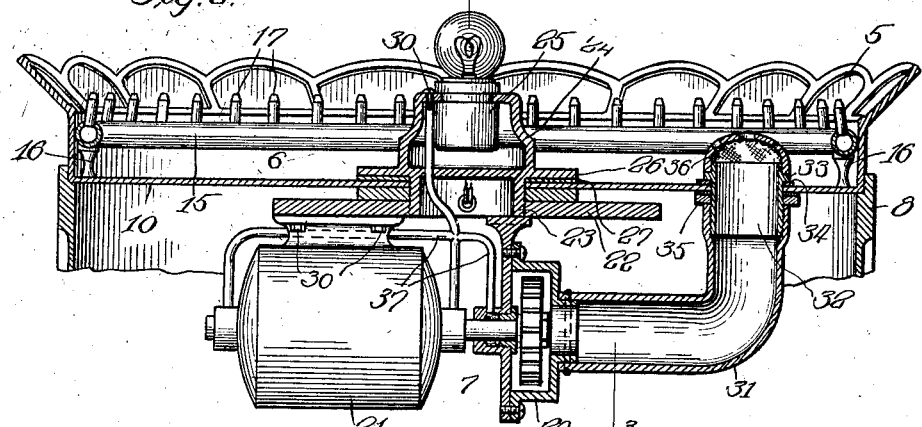
Fig. 2 is an enlarged vertical section through the fountain, part of the basin being broken away.
Figure 3:
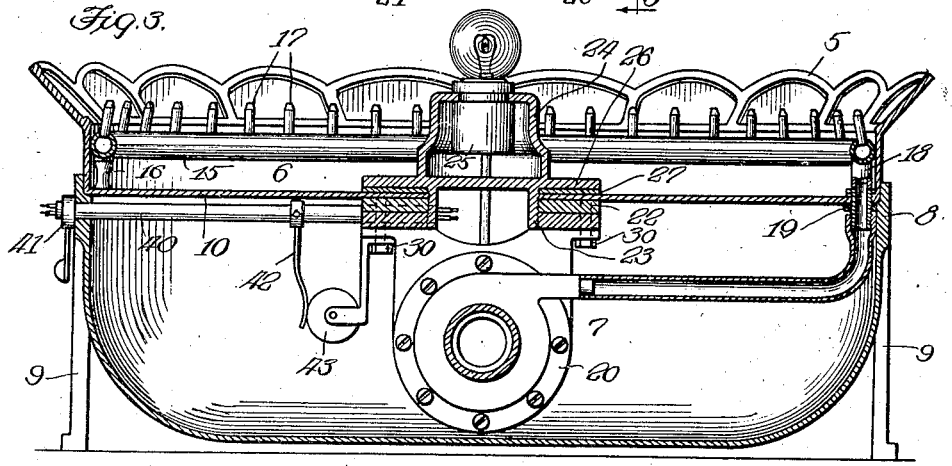
Fig. 3 is a section on the line 3—3 of Fig. 2.

A fountain comprises in general a basin or receptacle 5, a water projecting system 6 and a power pump plant 7.

*The basin.*

Basin 5, which forms a receptacle for the water may be of any desired size and shape. It may be composed of ornamental brass, bronze, copper, marble, glass, concrete or other suitable material having the necessary configuration to give the desired decorative effect.

The basin may be supported in any desired manner, as for example, upon legs or a pedestal or suspended by chains or other means. In the construction chosen for illustration, the basin is supported by a base having a basin shaped housing 8, for enclosing the power pump plant and depending legs 9. The basin is provided with a bottom 10.

*Water projecting system.*

The water projecting system comprises a continuous circular pipe 15 located within basin 5 adjacent the outer vertical wall thereof. Pipe 15 is supported a short distance above the basin bottom on legs 16 and is equipped with water directing nozzles 17. Nozzles 17 have small openings therethrough, communicating with the hole in pipe 15, and extend upwardly and inwardly to direct the streams or jets of water toward the center of the basin. The number, arrangement, size and character of these openings or nozzles may be varied as desired.

Pipe 15 has a water inlet 18 which may consist of a short length of pipe. This pipe fits tightly over a coupling 19 screwed into or otherwise fitted through an opening in basin bottom 10. Inlet 18 may be of such a length that it serves as one of the feet or legs of pipe 15. The fit between inlet 18 and coupling 19 is such as to prevent the escape of water therebetween but readily to allow pipe 15 to be lifted out of the basin. This construction allows the water projecting system to be removed for cleaning and repairs.

Power pump plant.

The power pump plant comprises a water pump 20 driven by an electric motor 21, and the necessary water pipes and couplings and electrical connections and control apparatus. Pump 20 may be of any desired construction, an ordinary rotary pump having been found to give satisfactory results. The pump is directly connected to motor 21.

Pump 20 and motor 21 are suspended beneath basin 5 from a plate 22. Plate 22 has a threaded opening through its center which cooperates with the threaded projection 23 of a lamp receptacle housing 24. Housing 24 forms a watertight socket for a suitable lamp receptacle 25 and is provided with a flange 26 which overlaps the edge of the opening in the center of the basin bottom 10 through which projection 23 extends. Suitable packing 27 may be placed between flange 26 and the basin bottom to prevent leakage.

The housing is assembled with the basin by inserting projection 23 through the opening in the basin bottom. Plate 22 is then screwed into place, tightly clamping the housing, packing and basin bottom together.

The motor and pump may be secured to plate 22 by any suitable means such as set screws 30 and are supported by housing 24. If desired the pump and motor may be made in a single unit having common bearings.

Connected to the intake end of pump 20 is an intake pipe 31. Pipe 31 may be of metal or hose. One end of pipe 31 fits tightly over a coupling 32. Coupling 32 extends through an opening in basin bottom 10 and is provided with a flange 33 overlying the edge of that opening. A packing ring 34 lies between flange 33 and bottom 10, and the coupling is held to the bottom with a watertight connection by a nut 35.

The end of coupling 32 which is within basin 5 is covered with a suitable strainer such as a fine mesh wire screen. A perforated metal cap 36 fits down over the end of the coupling to protect the screen.

The bearings of the motor and pump are lubricated by oil conveyed thereto through suitable tubes or ducts 37. The ducts lead up through the walls of housing 24 to an oil hole covered by a screw cap 30. The duct to the pump is shown leading into the packing box of the pump shaft. Thus the bearing is lubricated and the packing material is kept saturated with oil which prevents its drying out and causing leaks. The motor and pump may thus be lubricated without the necessity of providing openings to gain access thereto. This feature is of advantage because, with the fountain now in general use, it is necessary to turn the entire fountain upside down to lubricate the motor and pump.

The electric conductors to the motor and lamp are led thereto through the walls of the housing 8 in a conduit or pipe 40. Pipe 40 is rotatably supported and carries, at its outer end outside of the basin, a handle 41. Near its inner end pipe 40 carries a switch lever 42 which is insulated therefrom. Lever 42 engages the bare surface of a coil of resistance wire wound on a spool 43 suitably secured to the motor frame. This resistance wire and switch arm 42 are connected in the armature or field circuit of the motor. By rotating the switch arm 42 through handle 41 the effective length of the resistance wire may be varied to regulate the speed of the motor and pump to give the desired water pressure.

The advantages of the construction herein described are numerous.

The water projecting system, the lamp support and the power pump plant are units separable from and readily applied to or removed from the fountain basin. It is consequently unnecessary to carry a large stock of complete fountains. The basin may be selected and then the units applied thereto.

The water projecting system may be readily raised and removed from the basin at any time. This is of great advantage in cleaning. The jets of water projected into the air collect dust and dirt and the open basin also collects dust and dirt. As the water is used over and over, this dust and dirt collects in the pipe and nozzles and clogs the same. With the fountains now in general use, this dirt can not be readily removed. It may be pushed back from the nozzle opening by wires and the like, but it is not removed from the system and merely passes to another nozzle. By making the entire water projecting system easily removable, the pipe and nozzles may be lifted out and taken to a water faucet for cleaning. The dirt is thus completely removed from the system.

The improved water intake allows the screen to be removed for cleaning and the screen is well protected.

The motor and pump may be easily lubricated. The oil ducts act as reservoirs for oil and new oil may be added by simply removing a screw and filling the ducts. This can be done without trouble and the necessity of opening the fountain or turning it upside down.

The speed of the motor, and consequently the water pressure, is readily regulated from the outside of the fountain.

The entire structure is made up of units, any one of which may be readily removed for cleaning, repairs, etc.

The parts are all well protected.

Having described my invention what I claim as new and desire to secure by Letters Patent is:—

1. An electric fountain having a basin, a lamp receptacle housing extending above and projecting through the bottom of the basin, a power pump unit comprising a motor and pump supported from the housing below the basin, a removable water projector supported in the basin, and water connections between the pump and the projector.

2. An electric fountain comprising a fluid basin, a lamp receptacle housing for supporting a lamp receptacle above the fluid level in the basin and projecting through a hole in the bottom thereof, a fluid pump unit carried by the housing below the bottom of the basin, and a water projecting system in the basin and connected to the pump unit.

3. An electric fountain having a basin with an opening therethrough, a lamp supporting housing secured to the basin and extending through the opening therein, a power pump unit supported by the housing beneath the bottom of the basin, and a water projecting system in the basin and associated with the power pump unit.

4. An electric fountain unit having a fluid basin, a power pump plant comprising a motor and a fluid pump, a lamp receptacle support for supporting a lamp above the bottom of the basin and the power plant unit below the bottom of the basin, means for securing the support through the bottom of the basin with a water tight joint, and water connections from the pump to the bottom of the basin.

5. An electric fountain having a basin, an electric lamp supporting housing for holding a lamp above the bottom of said basin, and projecting through the bottom of said basin, a power pump unit comprising a fluid pump and a motor supported by said housing beneath the bottom of said basin, a pipe within said basin and separable therefrom but supported thereby and having openings through which fluid may be projected by said pump, and fluid connections between said pump, said basin and said pipe.

In testimony whereof I hereunto subscribe my name.

WALTER L. HAANEL.